May 24, 1938. H. W. DITTMEYER 2,118,073
SEAL FOR TUBES
Filed April 23, 1936
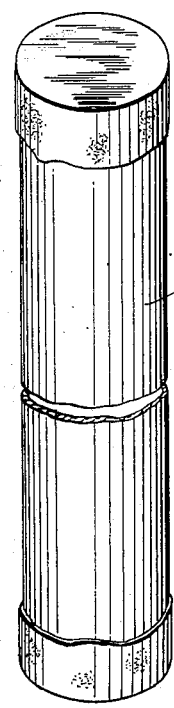
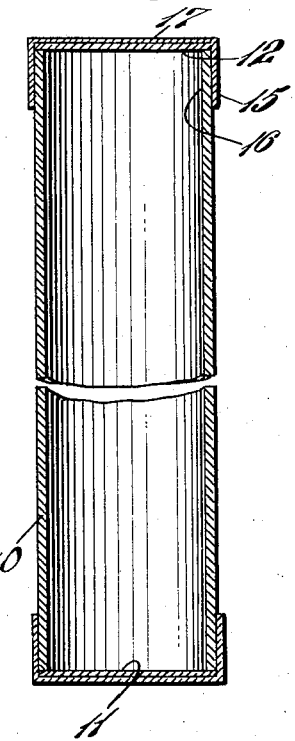
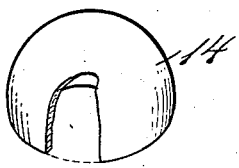
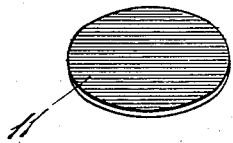
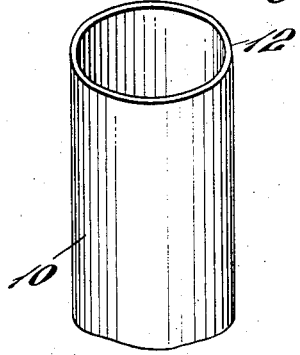
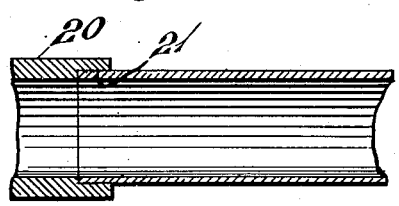
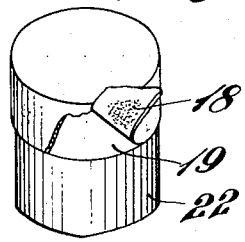
INVENTOR.
Herbert W. Dittmeyer
BY Barlow & Barlow
ATTORNEYS.

Patented May 24, 1938

2,118,073

UNITED STATES PATENT OFFICE 2,118,073

SEAL FOR TUBES

Herbert W. Dittmeyer, Cranston, R. I., assignor to United Wire and Supply Corporation, a corporation of Rhode Island Application April 23, 1936, Serial No. 75,985

2 Claims. (Cl. 138—96)

This invention relates to a seal for a tube, particularly a metal tube such as a copper, brass, bronze, nickel, silver, aluminum, or other non-ferrous alloys or metals; and this invention has for one of its objects the preserving and protecting of the inside of the tube area and surfaces, to keep and protect such from deterioration and damage, from dirt, dust and foreign substances, also to prevent or delay oxidization, discoloration, etc.

Another object of the invention is the preserving and protecting of the edge and end portions of the tube against damage by injury as scratching or distortion and in the condition in which the tube is originally finished.

Another object of the invention is the provision of a seal which may be advantageously applied in the same manner or by the same method and with equal ease to tubes of a variety of different diameters, thus eliminating the carrying of different sized seals in stock.

Another object of the invention is the provision of a seal material which makes more certain the perfect sealing of the tube and removes from the sealing operation the hazards of human carelessness and negligence and yet which will be maintained firmly on the end portion of the tube so as not to fall off while carried in stock or during shipment of the tube from one place to another.

Another object and advantage of this invention is that while the seal is firm on the ends it does not depend upon friction, driving fits, or expansion of the metal to hold it firmly in place, but rather is of a character to be shrunk on to the metal slowly, and does not scratch, injure, distort, or otherwise damage the most vital section of the tube and at the same time prevents oxidization to the outside surfaces of these most vital sections at the ends of the tube.

Another object of the invention is to avoid any marring, scratching or injuring the tube by using a softer material than the tube itself such as a non-metallic material on a metal tube which has the additional advantage of preventing a setting up of electrolysis as might occur where different metals are used.

Another object of the invention is the provision of a seal which can be readily and quickly removed, such for instance as by the use of the finger nail, pen knife or coin.

Another object of the invention is the use of a seal and preserving chemicals which later will have properties tending to chemically remove any impurity from the surface of the tube while the seal itself will absorb them so as to present the tube bright and fresh for the reception and adherence of solder when the seal is removed without further cleaning.

Another object of the invention is the provision of a sealing material which will be of a transparent nature although of various colors so that the covered surface may be observed and advertising material may be carried and protected therebeneath and given the desired color by reason of the covering material used.

Another object of the invention is to prevent a fracturing of the sealing film, such as might occur were it to contact with the edge of the metal tube which it seals by the use of a disk which at the same time may carry printed matter of an identifying or advertising nature and which will be effectively displayed and itself protected from injury beneath a transparent seal of a desired color.

With these and other objects in view, the invention consists of certain novel features of construction, as will be more fully described, and particularly pointed out in the appended claims.

In the accompanying drawing:

Fig. 1 is a perspective view of the opposite ends of a tube sealed in accordance with this invention, the break in the tube intermediate its ends indicating contraction of length;

Fig. 2 is a sectional view of the tube;

Fig. 3 is a perspective view broken away showing the capping seal;

Fig. 4 is a perspective view of the disk;

Fig. 5 is a perspective view of the end portion of a tube;

Fig. 6 is a perspective view showing the seal as being torn from its sealing position and exposing the clean end portion of the tube beneath;

Fig. 7 is a sectional view of a fitting being applied to the end of the tube.

With the advent of the so-called forged, cast or wrought copper or non-ferrous metal fittings designed for solder joints which does away with the necessity of cutting threads upon metal conduits at their connection with a fitting, the use of tubing having thinner walls, such as non-ferrous alloy tubing, has increased to replace the old thick wall metallic pipe conduits heretofore used with a more economical and superior installation.

In the use of this copper tubing it is desirable, and under some conditions essential, that the tubing remain clean and free from burrs, scale, oxide, dust, grease chips and all sorts of dirt, on its inner surface; and in order to accomplish this result, the ends of the tubing at the finish of its formation are sealed, such seal sometimes taking the form of flattening the tubing of soft material in small sizes or providing metal caps or wooden plugs in the larger sizes. In these two latter forms the additional closure member is often removable with difficulty or else may be so easily removed as to become accidentally displaced while the tube is carried in stock or during shipment. It is also very essential where the junction at the end of the tube is to be a solder joint that the end portion of the tube be accurate as to shape and dimension, and such closure members as I have enumerated tend to distort and scratch the end portion of the tube, which is exceedingly undesirable. In the case of the wooden plug, there is no protection given to the outside surface of the tube and but little protection given to the end thereof which are vital parts in the attachment by a solder joint; while in the case of the steel cap scratching, marring or distorting of the outer surface has occurred and also an electrolysis may sometimes be set up due to the different metals which will injure and corrode the vital parts of the tube. In order to avoid all of these difficulties and at the same time acquire some beneficial effects, I have found that I may cap, close or seal the end of the tube with a non-metallic material of cellulose composition which has been chemically treated and delivered in a somewhat plastic state and which is of such a character as to shrink upon exposure to the air so that when placed over the end of the tube will contract thereonto and tightly grip the surface thereof and effectively seal the same. The chemical treatment of the material may be such as to chemically act upon the outer surface of the tube to remove any impurities and absorb the impurities in the cellulose, thus not only preventing oxidation but removing any oxidation which may have previously occurred, and yet this cellulose cap may be easily removed when desired, such as by a simple instrument such as a pen knife or the like, or even the finger nail, to leave a surface of undistorted size or shape and perfectly clean for the reception of solder, it being unnecessary for further cleaning as the chemical treatment for maintaining the cellulose soft itself is a cleansing and fluxing agent for the solder; and the following is a more detailed description of the present embodiment of this invention, illustrating the preferred means by which these advantageous results may be acquired:

With reference to the drawing, 10 designates a copper tube which after the same has been drawn and annealed and the processing operations completed thereon is in a practically unoxidized clean condition, and to maintain the inner surface of the tube in this condition a seal is desired to be applied to the ends thereof. A disk of cardboard or some suitable material designated 11 of a diameter conforming to the outer diameter and shape of the tube 10 is inserted into the seal and applied therewith to the end 12 of the tube with the sealing film of a cellulose composition placed about this end of the tube.

This cellulose composition material is designated generally 14. It consists of a film or pliable sheet of material somewhat resembling celluloid but kept somewhat plastic or pliable by being immersed in some partial solvent, such for instance as alcohol, glycerine and formaldehyde. This material has the quality of contracting approximately 40% as soon as it is exposed to the air and becomes dried out, and when dried out it resembles celluloid as to hardness. Further, it sticks somewhat to the parts which it contacts.

When this cellulosic material 14 is positioned over the end of the tube 10 and the protecting disk 11 at its end and allowed to dry, the portions 15 draw in against the end portion 16 of the tube which support the film against further contraction and become tightly sealed against the end portions 16, while the web portion 17 becomes drum tight above the upper surface of the disk 11. The large shrinkage of the material makes it possible to use one size seal for a variety of different diameter tubes and removes from the sealing operation many hazards of human carelessness and negligence. The material in dried condition is impervious to air or moisture and forms an effective seal for the end of the tube while in no way scratching or marring the same. It is also found that this seal not only serves to prevent oxidation of the tube along the portion 15 which it contacts, but should there be any oxidation the nature of the softening liquid for preserving it in a plastic shape is such that these impurities will be dissolved and absorbed by the cellulosic material and the outer end portion of the tube will be either maintained or made clean and fresh and of original size for the reception of a solder joint fitting.

This cellulosic material does not mar, scratch, injure or in any way change the size or shape of the metallic tube and thus where accurate size and shape are required it is of a very advantageous character. Further, by reason of the non-metallic nature of the seal no electrolysis is set up and while not only protecting the end portions of the tube against oxidation it also serves as a cleansing agent or fluxing agent for solder.

I have shown the cellulosic material being torn away as at 18, illustrating the clean portion 19 beneath the same as contrasting with the oxidized portion 22. This tearing away may be easily accomplished by the finger nail, pen knife or a coin. After removal of this cap the tube may fit into the opening 21 in the fitting 20 which closely receives the same and is held therein by solder.

The disk 11 may carry suitable designation for sizes or other qualities of the tube and may have thereon trade-marks or any advertising material desirable. Thus, while serving a functional advantage also serves as a tag for visibility through the transparent cellulose material 14 which may be of any desired color for additional distinguishing characteristics to determine the product of one manufacturer with reference to that of another.

The foregoing description is directed towards the method and article illustrated, but I desire it to be understood that I reserve the privilege of resorting to all the equivalent changes to which the article and method are susceptible, the invention being defined and limited only by the terms of the appended claims.

I claim:

1. Means for sealing the end of a metal tube which is capable of oxidization in the atmosphere and adapted to be secured to another part by heat comprising a film of material to extend across an end of a tube and along the outer surface of the end portion thereof, said material being composed of a cellulosic material capable of tightly hugging the end portion of the tube and having a cleansing quality by being capable of absorbing impurities from the tube into the material and preserving said cleansed surface by preventing contact or oxidation of the covered end portion of the tube.

2. Means for sealing the end of a metal tube which is capable of oxidization in the atmosphere and adapted to be secured to another part by heat comprising a film of frangible material to extend across an end of a tube and along the outer surface of the end portion thereof, said material being composed of a cellulosic material capable of tightly hugging the end portion of the tube and having a cleansing quality by being capable of absorbing impurities from the tube into the material and preserving said cleansed surface by preventing contact or oxidization of the covered end portion of the tube, and a protecting disk withing said film of frangible material to contact the end surface of the tube and prevent rupture of the film by the tube.

HERBERT W. DITTMEYER.